United States Patent [19]

Liddell

[11] 3,753,225

[45] Aug. 14, 1973

[54] COMMUNICATION TECHNIQUE

[75] Inventor: Arlyn G. Liddell, Bountiful, Utah

[73] Assignee: Eaton Corporation, Cleveland, Ohio

[22] Filed: Nov. 19, 1971

[21] Appl. No.: 200,371

[52] U.S. Cl. .......... 340/146.1 AJ
[51] Int. Cl. .......... G06f 11/10
[58] Field of Search .......... 340/146.1 AJ

[56] References Cited

UNITED STATES PATENTS

| | | | |
|---|---|---|---|
| 2,689,950 | 9/1954 | Bayliss et al. | 340/146.1 AJ |
| 3,218,608 | 11/1965 | Barbeau | 340/146.1 AJ |
| 2,281,745 | 5/1942 | Buckingham | 340/146.1 AJ |
| 2,944,248 | 7/1960 | Auerbach et al. | 340/146.1 AJ |
| 3,124,783 | 3/1964 | Adams | 340/146.1 AJ |
| 3,566,351 | 2/1971 | Sekse et al. | 340/146.1 AJ |
| 3,579,185 | 5/1971 | Spruth | 340/146.1 AJ |

*Primary Examiner*—Charles E. Atkinson
*Attorney*—Lynn G. Foster

[57] ABSTRACT

A technique for communicating binary data comprising adding the transmitted data signals to develop a check sum, transmitting the check sum immediately following the "end-of-transmission" signal, receiving the transmitted data signals together with said check sum, adding the data signals received to develop a received signal sum, and comparing said received signal sum with said check sum to verify message integrity. Both method and apparatus are disclosed.

7 Claims, 2 Drawing Figures

Patented Aug. 14, 1973 3,753,225

2 Sheets-Sheet 2

COMMUNICATION TECHNIQUE

BACKGROUND

1. Field of Invention

This invention relates to communications methods and is particularly directed to methods and apparatus for verifying the integrity of transmission of data.

2. Prior Art

Modern methods of automatic control and data processing increasingly involve transmission of data or numerically coded information; for example, in computerized control of material handling equipment. Moreover, much of this data and numerically coded information is transmitted in pulsed or binary form. This form is particularly attractive as pulse-type signal transmission is considerably simpler than voice-type signal transmission and it is possible by use of this form, to communicate a data message more rapidly and to simultaneously transmit more messages than would be possible with voice transmission. In addition, the transmission of data in binary form permits direct communication between devices, such as computers and digital equipment, without requiring intermediate translation. However, as is well known, communication of data in binary form is generally accomplished by employing the presence of a signal pulse to represent a binary 1 and the absence of a signal to represent a binary 0. Unfortunately, in the course of transmission, it is possible to lose pulses or to introduce false pulses due to noise, malfunction of equipment, cross-talk between signal channels and the like. These communication problems are especially severe in systems for automatically controlling material handling equipment and the like, since such systems are usually operated in buildings containing large amounts of steel and housing electrically operated machinery which produces considerable electronic noise. Obviously, the likelihood of such errors increases with the speed of transmission. Numerous attempts have been made to overcome these problems. However, the prior art attempts have generally been directed toward prevention, rather than detection, of such errors. Thus, methods and apparatus have been developed to reduce noise, minimize or eliminate cross-talk, or improve the accuracy and reliability of the equipment. Nevertheless, it is a well known fact that such errors still occur. Moreover, the presence or absence of such methods or apparatus provides no indication as to whether or not a particular message has been accurately transmitted. To provide such an indication, a technique is frequently employed wherein all numerical data is repeated at the end of a message. However, this technique requires considerable time for dual transmission of the data and considerable effort to compare the two sets of data.

BRIEF SUMMARY AND OBJECTS OF THE INVENTION

These disadvantages of the prior art are overcome with the present invention and a novel communication technique is proposed which provides a rapid and reliable indication of message integrity, while requiring minimal time for transmission and comparison.

The advantages of the present invention are preferably attained by transmitting, at the end of each message, a check sum signal corresponding to the arithmetic sum of the transmitted data, with full carry propagation, summing the data received to obtain a second sum signal, and comparing the transmitted check sum with the second sum. These two sums appear immediately adjacent each other and any dissimilarity indicates the presence of an error. It is found that the vast majority of errors, regardless of cause, can be detected by this technique.

Accordingly, it is an object of the present invention to provide an improved communication technique.

Another object of the present invention is to provide methods and apparatus for detecting transmission errors in a communication.

A further object of the present invention is to provide methods and apparatus for rapidly and reliably verifying message integrity.

An additional object of the present invention is to provide improved communications techniques for automatic control of material handling equipment.

Another object of the present invention is to provide methods and apparatus for verifying message integrity which requires minimal time for transmission and comparison.

A specific object of the present invention is to provide methods and apparatus for verifying message integrity comprising transmitting, at the end of a message, a check sum signal corresponding to the arithmetic sum of the transmitted data, with full carry propagation, summing the received data to obtain a second sum signal, and comparing the transmitted check sum with the second sum.

These and other objects and features of the present invention will be apparent from the following detailed description, taken with reference to the accompanying drawings.

DETAILED DESCRIPTION OF THE ILLUSTRATED EMBODIMENT

Figure 1:
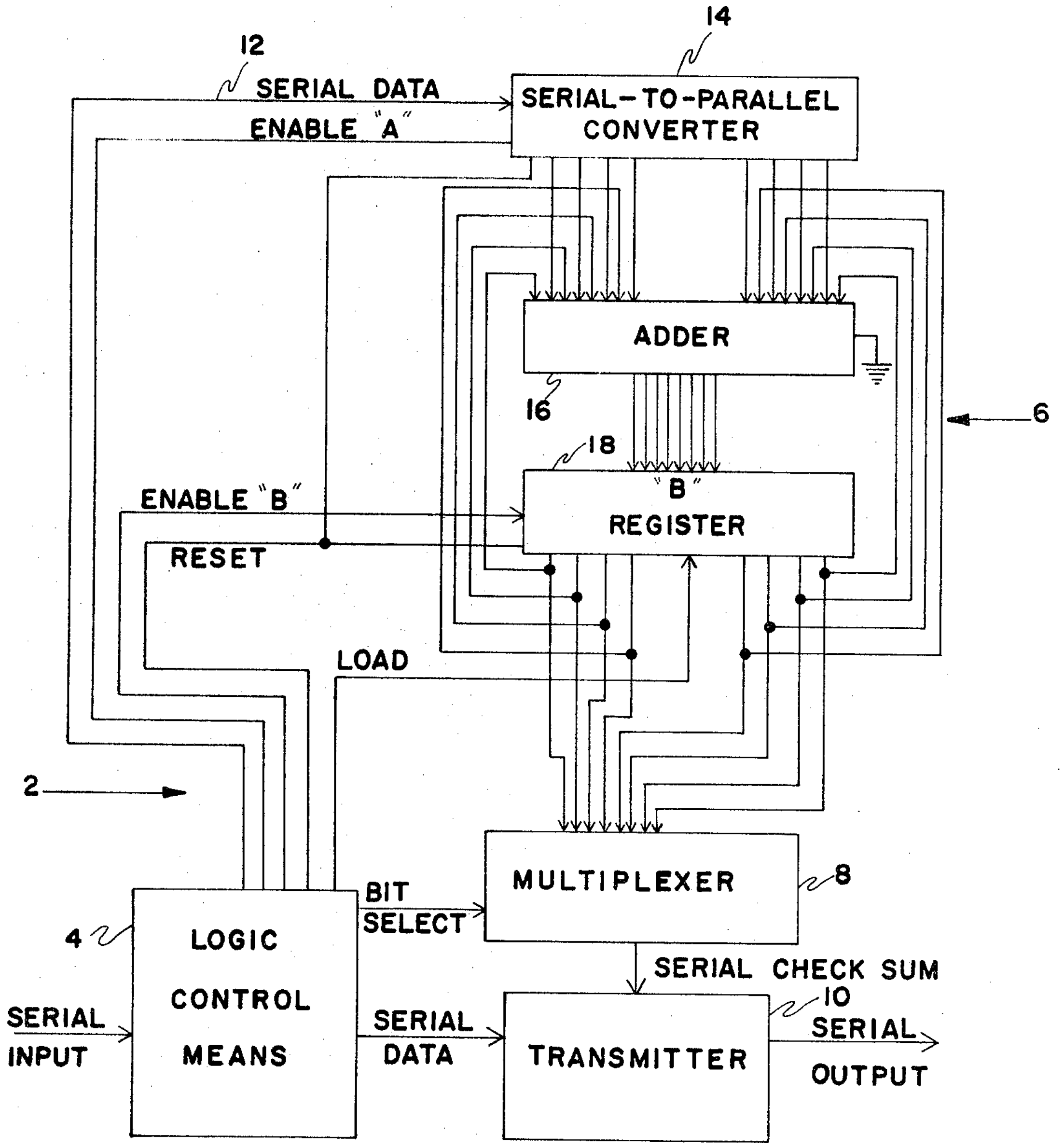
FIG. 1 is a diagrammatic representation showing a message transmitting device embodying the check sum gen-erator of the present invention.

In that form of the present invention chosen for purposes of illustration, FIG. 1 shows a message transmitting device, indicated generally at 2, having logic control means 4, a check sum generator 6, a multiplexer 8 and a transmitter 10. The logic control means 4 receives a binary message from a suitable message generating source, not shown, such as a computer, and passes the data, simultaneously, to the transmitter 10 and to the input 12 of check sum generator 6. The transmitter 10 may be any suitable device for transmitting signals by means of radio, telephone, slide wire or other communications media. Input 12 applies the data to a serial-to-parallel converter 14 which converts the data from serial-to-parallel form and feeds the data to an adder circuit 16 and register 18, which include full carry propagation. Each data word supplied to adder 16 is added to the number stored in register 18 and the sum is then inserted into register 18. When an "end-of-transmission" word is received, this is added, in the manner described, to the sum of the data words to produce the check sum which is then inserted in register 18. Logic control device 4 detects receipt of the "end-of-transmission" word and, after allowing time for the adding operation to take place, empties register 18 and passes the check sum through multiplexer 8 to the transmitter 10 and resets register 18 to zero. Thus, the check sum will be transmitted following the "end-of-transmission" word to complete the transmitted message.

Figure 2:
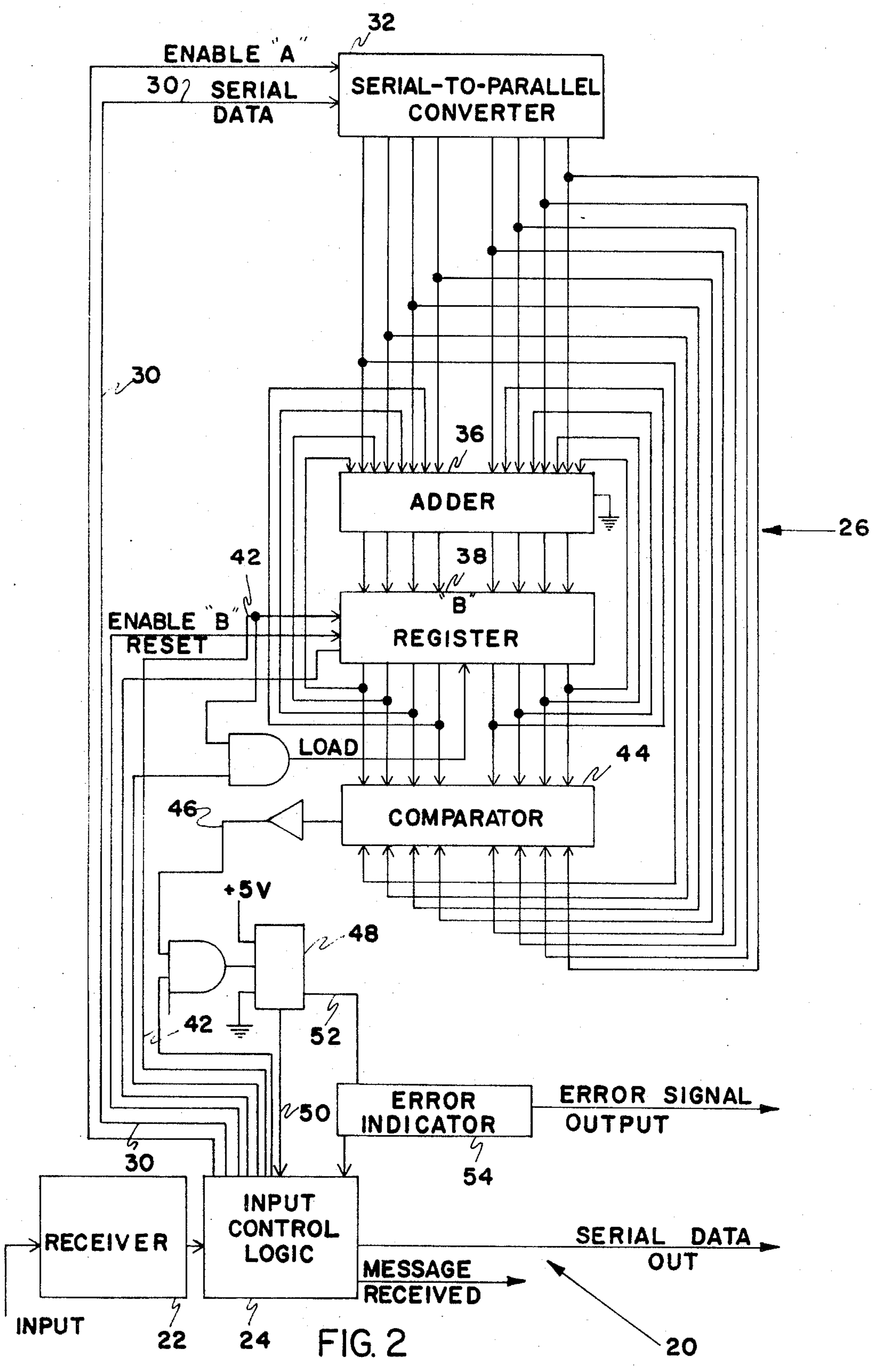
FIG. 2 is a diagrammatic representation showing a message receiving device embodying the check sum comparator of the present invention.

FIG. 2 illustrates the signal receiving means indicated generally at 20, including a receiver 22 for receiving signals from transmitter 10 of FIG. 1, input control logic circuit 24, and the check sum comparator, indicated generally at 26. The signal receiving means 20 may be included in any data utilizing device, such as a seocnd computer or a device controlled by the transmitting computer. The incoming message, received by receiver 22, is supplied to the input control logic circuit 24 and the data is passed to serial-to-parallel converter 32 of the check sum comparator 26. Converter 32 converts the data words from serial-to-parallel form and feeds the data to an adder circuit 36 and register 38, which include full carry propagation. Each data word supplied to adder 36 is added to the number stored in register 38 and the sum is inserted into register 38. When the "end-of-transmission"to word is received, it is added to the sum of the data to produce the received signal sum, which is inserted into register 38. However, the "end-of-transmission" word is decoded by the control logic circuit 24 which acts through conductor 42 to lock register 38. Thereafter, when the transmitted check sum, from message transmitter 2 in FIG. 1, is received, it is applied to comparator circuit 44 which compares the transmitted check sum with the received signal sum, stored in register 38. If the received signal sum, stored in register 38, is the same as the transmitted check sum, comparator circuit 44 applies a signal through conductor 46 to flip-flop circuit 48 and conductor 50 to reset the comparator 44 to zero and to cause input control logic circuit 24 to transmit a "message received" signal. If the received signal sum, stored in register 38, is different from the transmitted check sum, comparator circuit 44 passes a signal through conductor 46 to flip-flop circuit 48 and conductor 52 to actuate a suitable "error" indicator 54.

In use, let us assume that the message to be transmitted includes three data words, the "end-of-transmission" word, and the check sum. Hence, the transmitted message will appear as follows:

| | | |
|---|---|---|
| Chart I | 00101101 | (first data word) |
| | 01010010 | (second data word) |
| | 10100010 | (third data word) |
| | 00101000 | (end-of-transmission word) |
| | 101001001 | (check sum) |

Let us further assume that errors occur during transmission so that the message is received as follows (errors underlined):

| | | |
|---|---|---|
| Chart II | 00100101 | (first data word) |
| | 01110010 | (second data word) |
| | 10100010 | (third data word) |
| | 00101000 | (end-of-transmission word) |
| | 101100001 | (received signal sum in register 38 of comparator 26) |
| | 101001001 | (transmitted check sum) |

It is immediately apparent that the received signal sum, in register 38, is different from the check sum and, thus, the presence of the errors is indicated.

When two or more errors occur in a given message, there is a finite possibility that the errors will not be detected. This result will obtain when the errors are compensating. Thus, the errors would not be detected if the message of Chart I were received as follows (errors underlined):

| | | |
|---|---|---|
| Chart III | 00100101 | (first data word) |
| | 01010010 | (second data word) |
| | 10101010 | (third data word) |
| | 00101000 | (end-of-transmission word) |
| | 101001001 | (received signal sum in register 38) |
| | 101001001 | (transmitted check sum) |

However, this situation will obtain only where plural errors are present and occur in compensating positions. The likelihood of such a coincidence is remote.

Obviously, where two-way communication is required, as between a computer and a material handling device controlled thereby, it may be desirable to provide both the check sum generator of FIG. 1 and the check sum comparator of FIG. 2 at each end of the communication system to assure message integrity of transmissions in both directions. In addition, numerous variations and modifications may be made without departing from the present invention. Accordingly, it should be clearly understood that the form of the present invention described above and shown in the accompanying drawing is illustrative only and is not intended to limit the scope of the present invention.

What Is Claimed Is:

1. A communication system comprising:

a source of binary signals including an "end-of-transmission" signal, transmitting means for transmitting said binary signals, first adder means for adding the signals transmitted to develop a check sum signal comprising the sum of the binary signals transmitted by said transmitting means including said "end-of-transmission" signal, logic means causing said transmitting means to transmit said check sum signal from said first adder means, upon detection by said logic means of said "end-of-transmission" signal being transmitted by said transmitting means, receiver means for receiving said binary signals and said check sum signal from said transmitting means, and second adder means for adding the binary signals received by said receiver means to develop a received sum signal.

2. The system of claim 1 further comprising:

comparison means connected to receive said check sum signal and serving to compare said check sum signal with said received sum signal, receiver logic means causing said receiver means to transmit said binary signals to said second adder means and said check sum signal to said comparison means, and means for indicating the results of said comparison.

3. The system of claim 1 wherein said first and second adder means each comprise:

means for converting said binary signals to data words, a register for storing a data word, an adding circuit having full carry propagation for receiving a data word from said converting means and adding said data word to any data word contained in said register to obtain a complete total in said register.

4. The system of claim 3 wherein said converting means comprises:

a series-to-parallel converter for receiving said binary signals in serial form, converting said binary signals to data words in parallel form, and inserting said data words in parallel form into said adding circuit.

5. A communication method comprising the steps of:

transmitting a plurality of binary signals including an "end-of-transmission" signal, adding the binary signals transmitted to obtain a check sum comprising a total of the transmitted signals including said "end-of-transmission" signal, transmitting said check sum only upon transmitting said "end-of-transmission" signal, receiving the transmitted binary signals, adding the binary signals received to obtain a received signal sum, and comparing said received signal sum with said check sum to verify the integrity of the transmission.

6. An automatic control system for material handling equipment comprising:

a computer generating binary command signals including an "end-of-transmission" signal, a material handling device to be controlled by said computer, first transceiver means connected to said computer to transmit said command signals, check sum generating means connected to add said command signals to develop a check sum signal of the total transmitted command signals including said "end-of-transmission" signal and to cause said first transceiver to transmit said total of said check sum signal immediately subsequent to transmission of said "end-of-transmission" signal, second transceiver means carried by said material handling device for receiving said command signals and said check sum signal and serving to add said command signals to develop a received sum signal of the total received command signals, and comparison means connected to said second transceiver and serving to compare said total of said transmitted check sum signal with said total of said received sum signal.

7. The method of controlling a material handling device, said method comprising the steps of:

transmitting binary command signals including an "end-of-transmission" signal to a material handling device to be controlled by said command signals, adding said command signals to obtain a check sum of the total command signals transmitted, transmitting said check sum to said material handling device after detecting said "end-of-transmission" signal, receiving the transmitted command signals at said material handling device, adding the transmitted command signals to obtain a received signal sum of the total command signals received, and comparing said check sum total with said received signal sum total to verify the integrity of the transmission.

* * * * *